United States Patent
Suwa et al.

(10) Patent No.: US 9,021,318 B2
(45) Date of Patent: Apr. 28, 2015

(54) VOICE PROCESSING APPARATUS AND METHOD FOR DETECTING AND CORRECTING ERRORS IN VOICE DATA

(71) Applicant: Panasonic Corporation, Kadoma-shi, Osaka (JP)

(72) Inventors: Yutaka Suwa, Fukuoka (JP); Yukio Naka, Fukuoka (JP); Hiroyuki Ishihara, Fukuoka (JP); Norihiro Toyomura, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 68 days.

(21) Appl. No.: 13/849,889

(22) Filed: Mar. 25, 2013

(65) Prior Publication Data
US 2013/0218556 A1    Aug. 22, 2013

Related U.S. Application Data

(63) Continuation of application No. 12/365,344, filed on Feb. 4, 2009, now Pat. No. 8,407,536.

(30) Foreign Application Priority Data

Feb. 5, 2008  (JP) ................................. 2008-024679

(51) Int. Cl.
*G06F 11/00* (2006.01)
*G10L 19/005* (2013.01)
*H04L 1/00* (2006.01)

(52) U.S. Cl.
CPC ............ *G10L 19/005* (2013.01); *H04L 1/0061* (2013.01)

(58) Field of Classification Search
CPC ... G06F 21/305; G06F 21/6209; G06F 21/74; G06F 21/88; G06F 2221/2105; G06F 2221/2115; G06F 11/3688; G06F 17/30867; G06F 8/70; G06F 9/4448
USPC .................................................. 714/704, 776
See application file for complete search history.

(56) References Cited

U.S. PATENT DOCUMENTS

| 5,309,443 A | 5/1994 | Schorman |
| 5,517,511 A | 5/1996 | Hardwick et al. |
| 5,633,980 A | 5/1997 | Ozawa |

(Continued)

FOREIGN PATENT DOCUMENTS

| JP | 6-037725 | 2/1994 |
| JP | 6-097846 | 4/1994 |

(Continued)

*Primary Examiner* — Bryce Bonzo
*Assistant Examiner* — Elmira Mehrmanesh
(74) *Attorney, Agent, or Firm* — Greenblum & Bernstein, P.L.C.

(57) ABSTRACT

A voice processing apparatus is provided in an ADPCM (Adaptive Differential Pulse Code Modulation) voice transmission system in which voice data that is differentially quantized through an ADPCM scheme is transmitted. The voice processing apparatus includes an error detector which detects whether or not an error occurs in a transmission frame containing data that indicates a differential value, and an error determiner which determines a level of the error detected by the error detector when the error detector detects the error. The voice processing apparatus also includes a voice processor which corrects the voice data with a correction value depending on the level of the error detected by the error detector and an ADPCM decoder which decodes the voice data corrected by the voice processor.

14 Claims, 10 Drawing Sheets

(56) References Cited

U.S. PATENT DOCUMENTS

| | | |
|---|---|---|
| 5,687,189 A | 11/1997 | Smith et al. |
| 5,710,781 A * | 1/1998 | Zinser et al. ............ 714/747 |
| 5,781,570 A | 7/1998 | Hattori |
| 5,799,039 A | 8/1998 | Laird et al. |
| 5,925,146 A | 7/1999 | Murata et al. |
| 5,928,379 A | 7/1999 | Hattori |
| 6,578,162 B1 | 6/2003 | Yung |
| 7,010,323 B2 | 3/2006 | Suwa |
| 7,295,860 B2 | 11/2007 | Suwa |
| 7,395,463 B2 | 7/2008 | Suwa |
| 7,478,309 B2 | 1/2009 | Banba |
| 2003/0032445 A1 | 2/2003 | Suwa |
| 2005/0166117 A1 | 7/2005 | Suwa |
| 2006/0099989 A1 | 5/2006 | Suwa |
| 2009/0204873 A1 | 8/2009 | Suwa et al. |
| 2013/0218556 A1 | 8/2013 | Suwa et al. |

FOREIGN PATENT DOCUMENTS

| | | |
|---|---|---|
| JP | 6-204983 | 7/1994 |
| JP | 7-143074 | 6/1995 |
| JP | 8-046577 | 2/1996 |
| JP | 8-288914 | 11/1996 |
| JP | 8-292799 | 11/1996 |
| JP | 9-505970 | 6/1997 |
| JP | 9-261185 | 10/1997 |
| JP | 9-321713 | 12/1997 |
| JP | 10-209977 | 8/1998 |
| JP | 2000-059243 | 2/2000 |
| JP | 2003-060554 | 2/2003 |
| JP | 5256756 | 8/2013 |

* cited by examiner

FIG. 6

| No. | SYNCHRONIZING ERROR | CONTROL DATA ERROR | VOICE DATA ERROR | | ERROR VALUE (EXAMPLE) | CORRECTION INTERVAL VALUE (EXAMPLE) |
|---|---|---|---|---|---|---|
| | | | TOTAL NUMBER OF SUB-FRAMES INCLUDING ERROR IS LESS THAN SUB-FRAME ERROR THRESHOLD VALUE | TOTAL NUMBER OF SUB-FRAMES INCLUDING ERROR IS EQUAL TO OR MORE THAN SUB-FRAME ERROR THRESHOLD VALUE | | |
| 1 | NO | NO | | NO | 0 | - |
| 2 | NO | EXIST | | NO | 0 | 4 |
| 3 | EXIST | NO | | NO | 0 | 4 |
| 4 | EXIST | EXIST | | NO | 1 | 4 |
| 5 | NO | NO | YES | | 1 | 4 |
| 6 | EXIST | NO | YES | | 1 | 4 |
| 7 | NO | EXIST | YES | | 1 | 4 |
| 8 | EXIST | EXIST | YES | | 2 | 4 |
| 9 | NO | NO | | YES | 3 | 2 |
| 10 | EXIST | NO | | YES | 3 | 2 |
| 11 | NO | EXIST | | YES | 3 | 2 |
| 12 | EXIST | EXIST | | YES | 3 | 1 |

VOICE PROCESSING APPARATUS AND METHOD FOR DETECTING AND CORRECTING ERRORS IN VOICE DATA

This application is a continuation of co-pending U.S. patent application Ser. No. 12/365,344, filed Feb. 4, 2009, the content of which are expressly incorporated here in by reference in their entireties.

BACKGROUND

1. Technical Field

The present invention relates to a voice processing apparatus and a voice processing method for detecting and correcting an error of voice data.

2. Description of Background Art

In a cordless telephone or a PHS (Personal Handy-phone System), differential voice data which is quantized through an ADPCM scheme is transmitted or received in the unit of transmission frame. The "quantized differential voice data" as used in this specification refers to a differential value of an actual measurement value to an estimated value, and the received voice data is decoded as a voice to be outputted.

JP-A-8-288914 discloses an error processing method of suppressing noise in the PHS, in which voice data is determined whether or not there is an error in a transmission frame and a value of the voice data which is determined that there is an error in the transmission frame is converted to "0" or a small value.

However, in the error processing method described in JP-A-8-288914, when the error is detected in the voice data of the transmission frame, regardless of a level of the error, the voice data is simply converted to a value even though the error is minor. For this reason, all the voice data in which the error is detected are converted to "0" or a value close to zero. Converting the value of the voice data which is a differential value to "0" or a value close to zero means that a decoded voice is muted or faded out. Further, even though the noise is suppressed, the voice to be originally outputted is also muted, so that there was a problem that recognition of the original voice is difficult.

The present invention is made in view of the above circumstances, and an object is to provide a voice processing apparatus and a voice processing method which can easily recognize an original voice while suppressing noise.

SUMMARY

In order to solve the above-mentioned problem encountered by the related art above, according to an aspect of the invention, there is provided a voice processing apparatus including: an error detector which detects an error in a frame containing voice data; a correction value calculator which determines a level of the error detected by the error detector and calculates a correction value according to the level; and a voice data corrector which corrects the voice data by using the correction value calculated by the correction value calculator.

According to the aspect of the invention, since the correction of the voice data is performed by using the correction value according to the level of the error, the voice data in which the level of the error is high and the voice data in which the level of the error is low can be corrected by using a different correction value. Therefore, the error in a low level can be slightly corrected and only the error in a high level can be largely corrected, so that while suppressing the noise of the voice data in which the error is in the high level, the original voice in which the error is in the low level is hardly converted. Accordingly, while suppressing the noise, the recognition of the voice becomes easier.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein:

FIG. 6 is a diagram illustrating an error value and a correction interval value.

DETAILED DESCRIPTION

Figure 1:
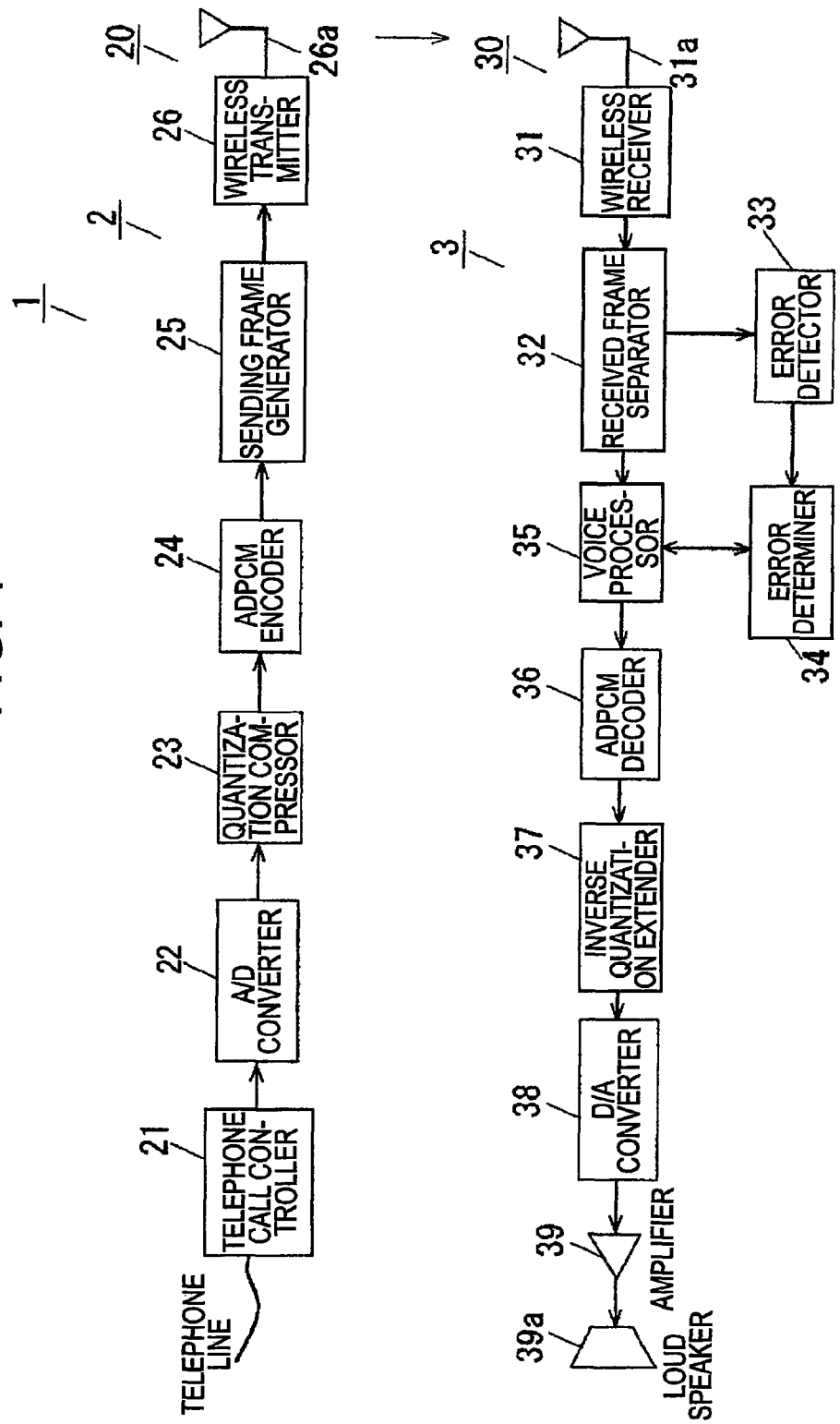
FIG. 1 is a block diagram illustrating a transmitter of a primary device and a receiver of a secondary device of a cordless telephone.

A cordless telephone as an example of a voice processing apparatus according to an embodiment of the invention will be described with reference to the drawings. FIG. 1 is a block diagram illustrating a transmitter of a primary receiver of a secondary device of a cordless telephone.

The cordless telephone 1 shown in FIG. 1 which serves as an ADPCM voice transmission system is provided with a primary device 2 which is connected to a telephone line, and a secondary device 3 which transmits or receives wireless signals from/to the primary device 2. Further, even though FIG. 1 shows here that the primary device 2 is provided only with a transmitter 20 and the secondary device is provided only with a receiver 30, the primary device 2 is also provided with a receiver which demodulates and decodes the wireless signals to be transmitted through the telephone line from the secondary device 3, and the secondary device 3 is also provided with a transmitter which encodes and modulates voice signals and transmits wireless signals to the primary device 2.

The transmitter 20 of the primary device 2 is provided with a telephone call controller 21, an A/D converter 22, a quantization compressor 23, an ADPCM encoder 24, a transmission frame generator 25, and a wireless transmitter 26.

The telephone call controller 21 performs transmission or reception of a call or a voice signal through the telephone line. The A/D converter 22 converts analog voice signals into digital voice data. The quantization compressor 23 performs a quantization process and a compression process on the voice data based on an A-law or a μ-law. The ADPCM encoder 24 encodes the quantized and compressed voice data in an estimated 4-bit adaptive differential value by the use of G.726 in the ADPCM scheme. In the ADPCM scheme, a differential value of an actual measurement value to an adaptively estimated value is outputted as the voice data.

The transmission frame generator 25 generates a transmission frame which is a frame to be sent and includes contains a syncword, a control field, the voice data which is the differential value, and a CRC which is check data. The wireless transmitter 26 sends the wireless signal, which is a signal formed by modulating the transmission frame inputted from the transmission frame generator 25, through an antenna 26a in a time-division multiplex method.

The receiver 30 of the secondary device 3 is provided with a wireless receiver 31, a received-frame separator 32, an error detector 33, an error determiner 34, a voice processor 35, an ADPCM decoder 36, an inverse-quantization extender 37, a D/A converter 38, and an amplifier 39.

The wireless receiver 31 demodulates the wireless signal which is received through an antenna 31a, and outputs the demodulated wireless signal as the transmission frame. The received-frame separator 32 separates the syncword, the control field, the voice data, and the CRC from the transmission frame, respectively. The error detector 33 detects whether or not an error occurs in the separated syncword, the control field, and the voice data. The syncword error is detected by whether or not it has a predetermined bit pattern. It is detected whether or not the error occurs in the control field and the voice data by checking the CRCs corresponding thereto, respectively. The error determiner 34 determines a level of the detected errors and then determines a correction value.

The voice processor 35 corrects the voice data which is the differential value (4 bits) before being decoded by the ADPCM decoder 36 based on the correction value. When it is determined that the error occurs, a reception error process, which will be described later, is performed and the voice data is outputted. When it is determined that the error does not occur, the voice data is not corrected but outputted as it is.

The ADPCM decoder 36 generates voice data which is decoded based on the received voice data (differential value of 4 bits) and an estimated value obtained by its internal prediction. When it is determined that the error occurs, the voice data (4 bits) is subjected to a correction process by the voice processor 35. The ADPCM decoder 36 performs a decoding process based on the voice data in which the correction process is completed.

The inverse-quantization extender 37 performs an inverse quantization process and an extension process on the voice data based on the A-law or the μ-law. The D/A converter 38 converts the voice data which is digital data into an analog voice signal. The amplifier 39 amplifies and outputs the analog voice signal to a loud speaker 39a.

Figure 2:
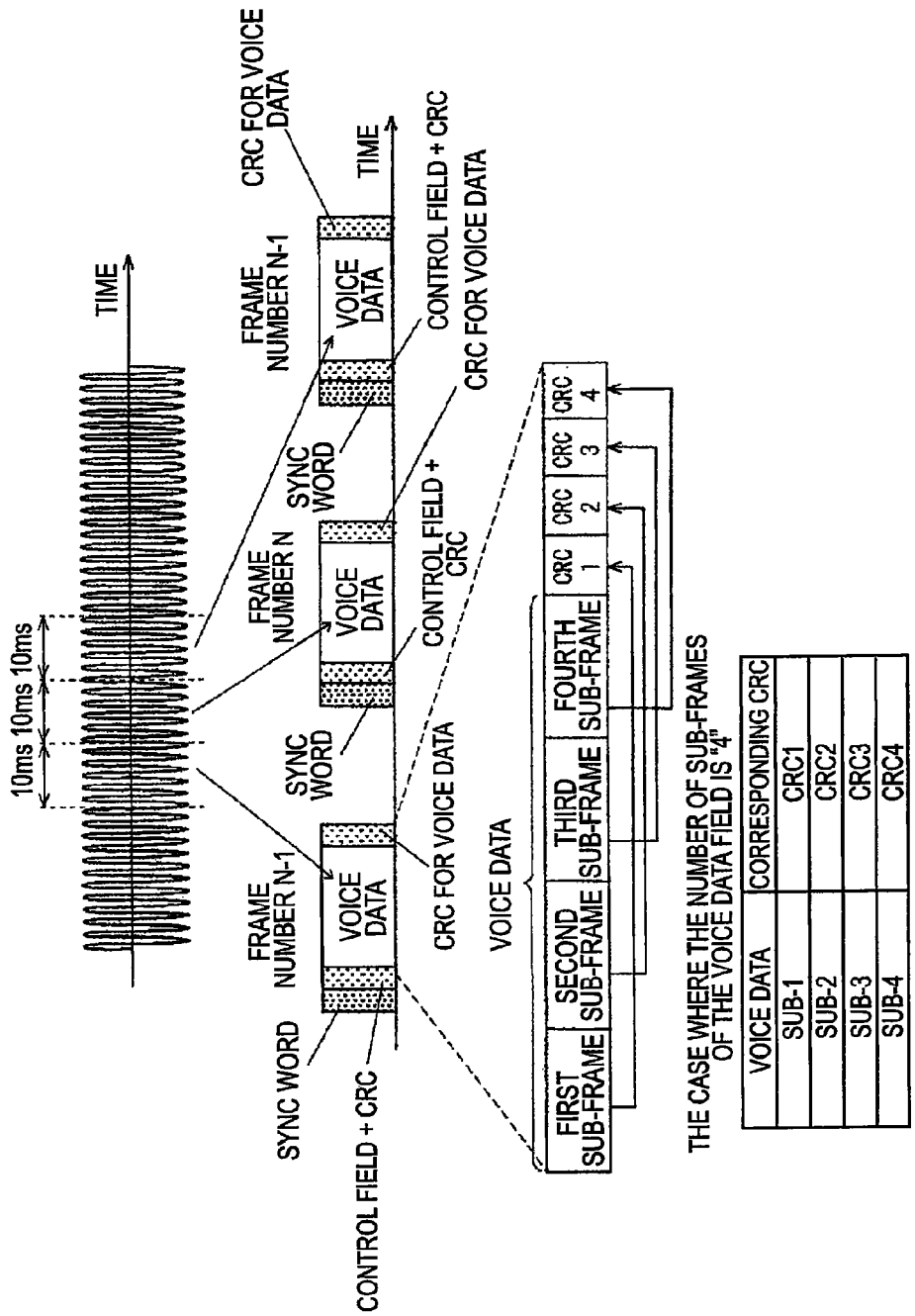
FIG. 2 is a diagram illustrating a format of a transmission frame.

The cordless telephone 1 according to the embodiment of the invention is configured as described above. Here, the transmission frame which is generated by the transmission frame generator 25 of the primary device 2 and the transmission frame which is separated by the received frame separator 32 will be described in detail with reference to FIG. 2. FIG. 2 is a diagram illustrating a format of the transmission frame.

The transmission frame contains the voice data which is encoded by the ADPCM encoder 24. The transmission frame has the syncword, the control field and the CRC with respect to the control field, sub-frames from a first sub-frame to a fourth sub-frame in which a bit array of the voice data is divided into four, and the CRC corresponding to each sub-frame.

Since the voice data which is transmitted at 32 kbps from the wireless transmitter 26 is formed so as to be one transmission frame at every 10 ms, one transmission frame contains the voice data of 320 bits. Therefore, one sub-frame is formed with 80 bits, and thus is formed with 20 words of an ADPCM word which is formed with 4 bits.

The transmission frame generator 25 generates and outputs the transmission frame described above to the wireless transmitter 26. In addition, the received frame separator 32 separates the transmission frame and outputs the separated transmission frames, respectively, to the error detector 33 and further outputs the voice data to the voice processor 35.

Figure 3:
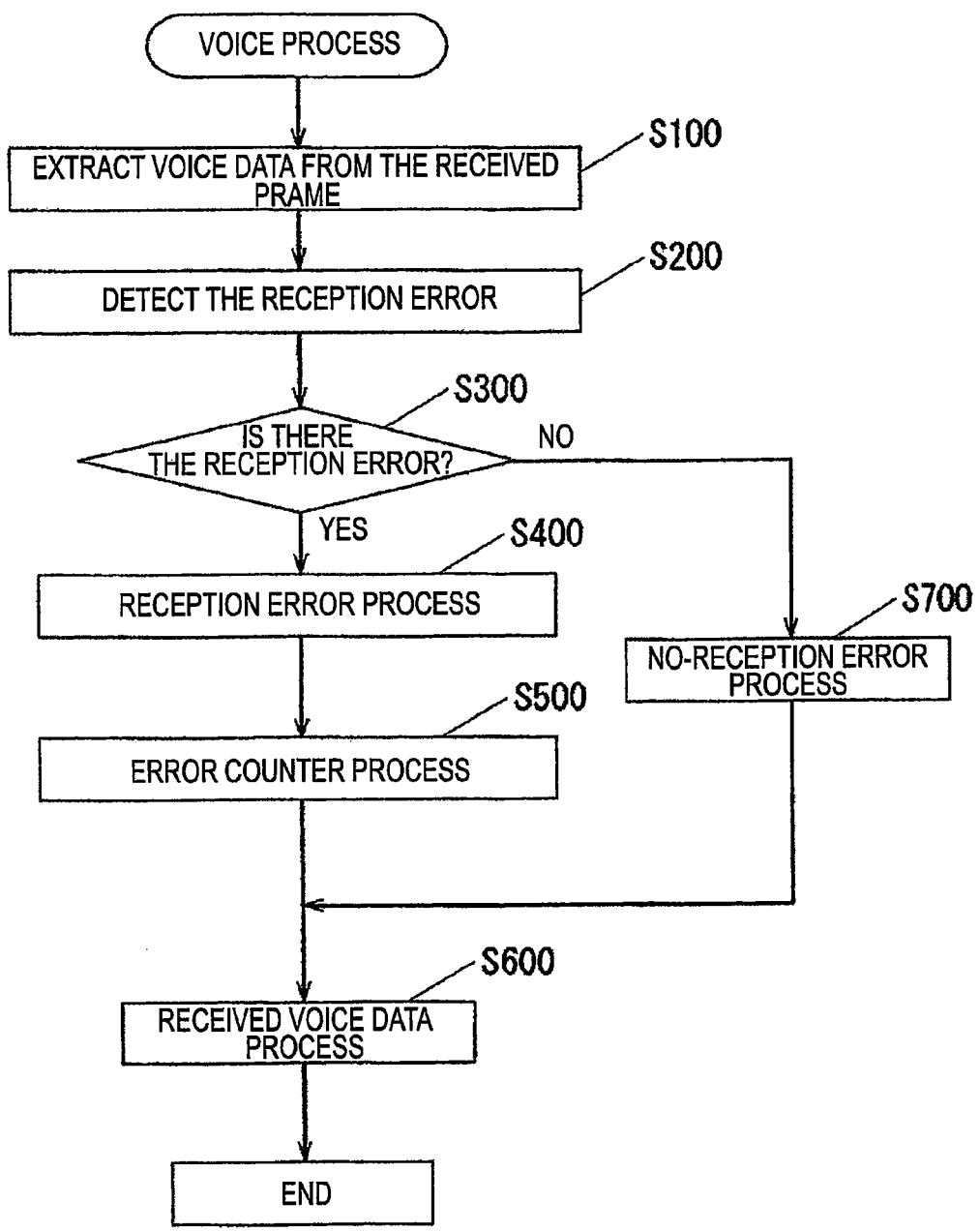
FIG. 3 is a flowchart illustrating a voice process of a receiver of a secondary device.
Figure 4:
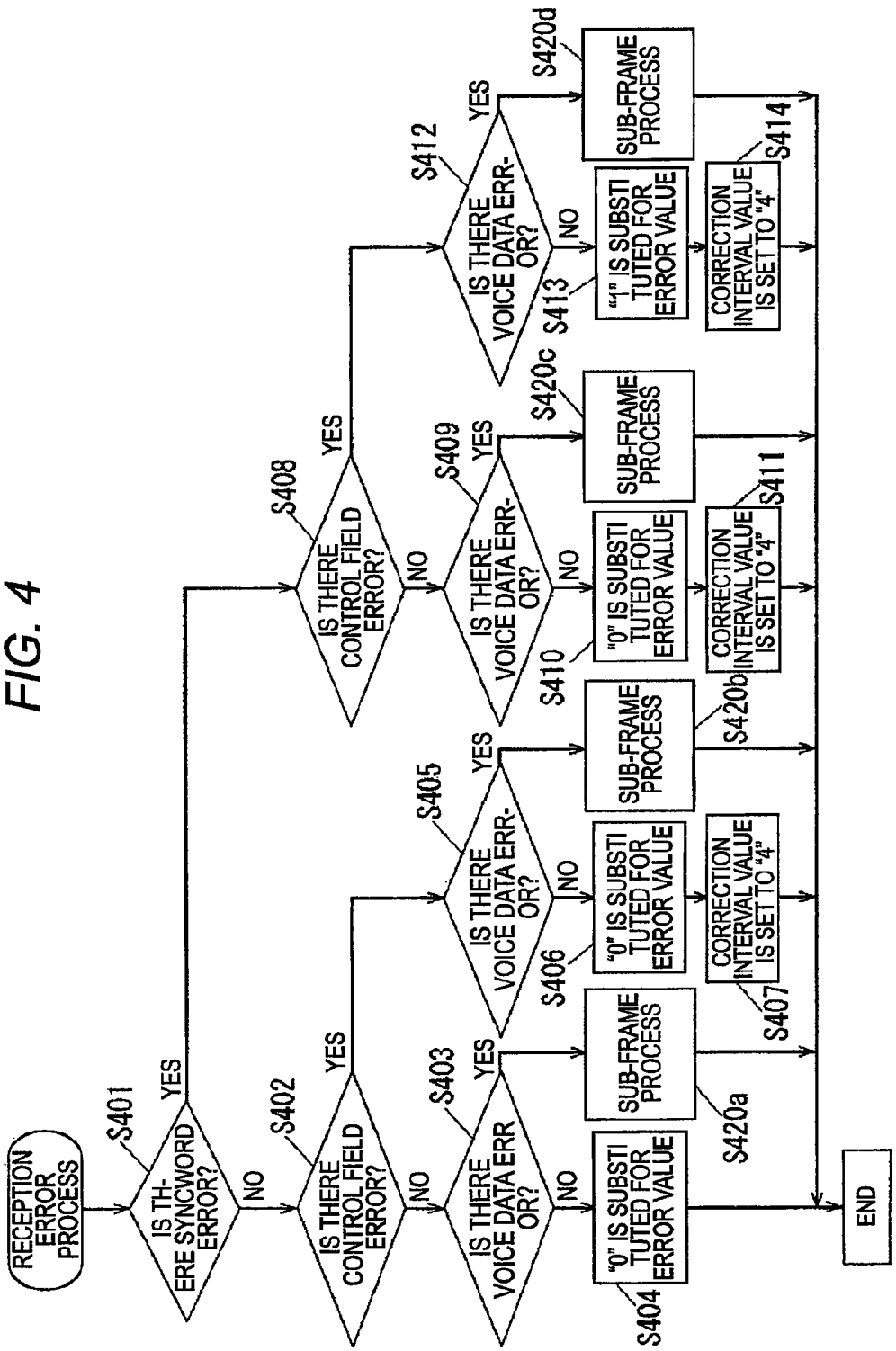
FIG. 4 is a flowchart illustrating a reception error process.
Figure 5:
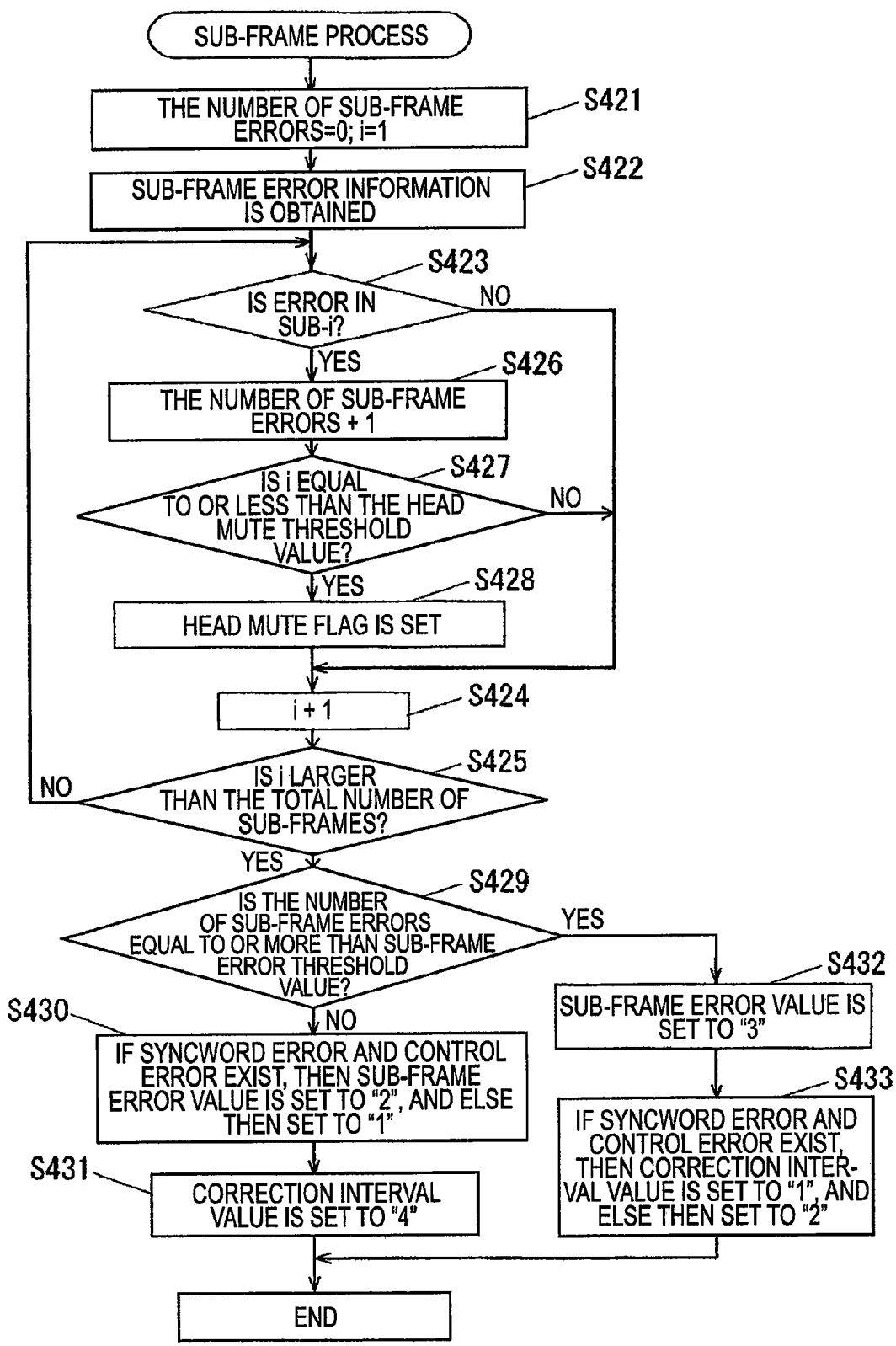
FIG. 5 is a flowchart illustrating a sub-frame process.
Figure 7:
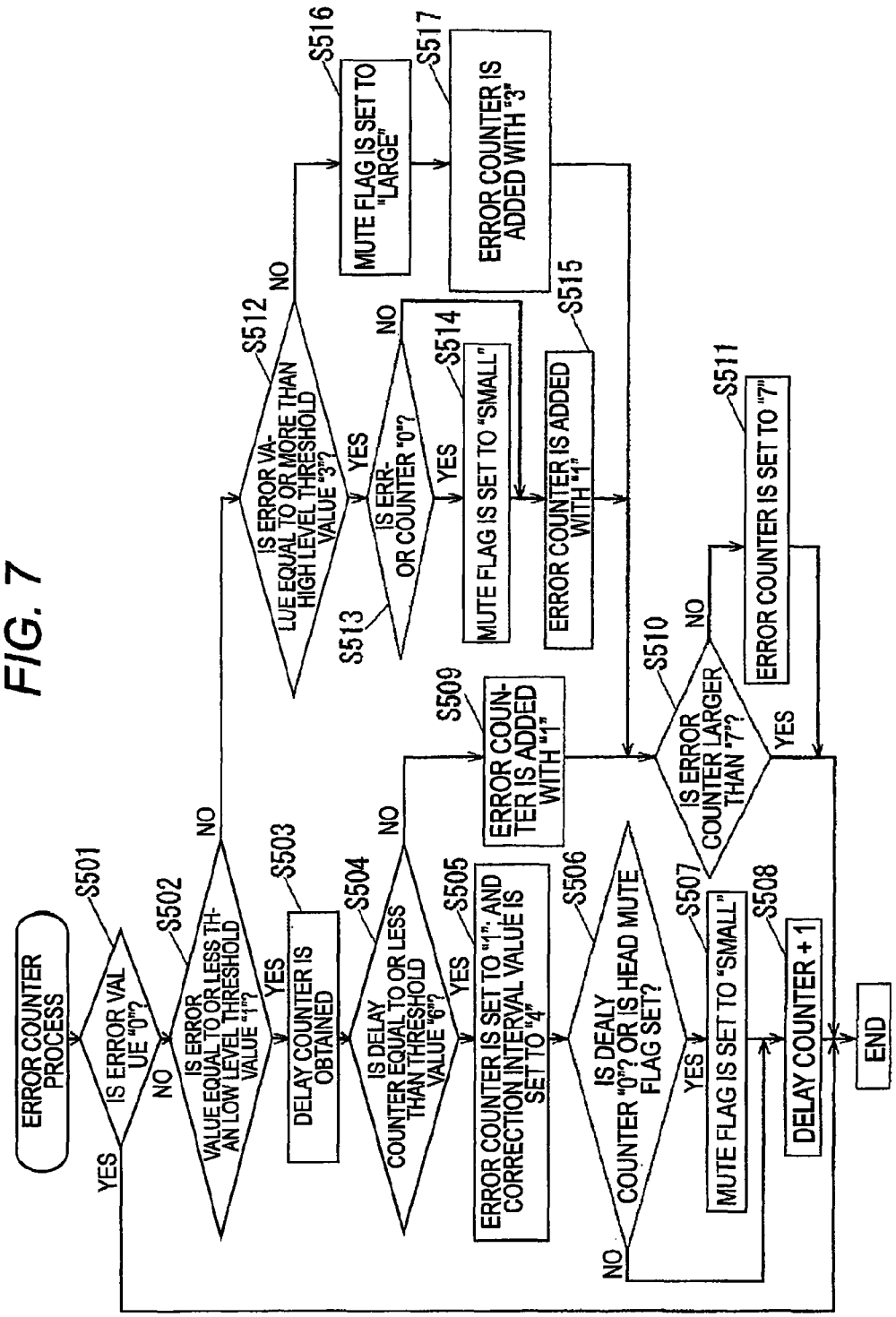
FIG. 7 is a flowchart illustrating an error counter process.
Figure 8:
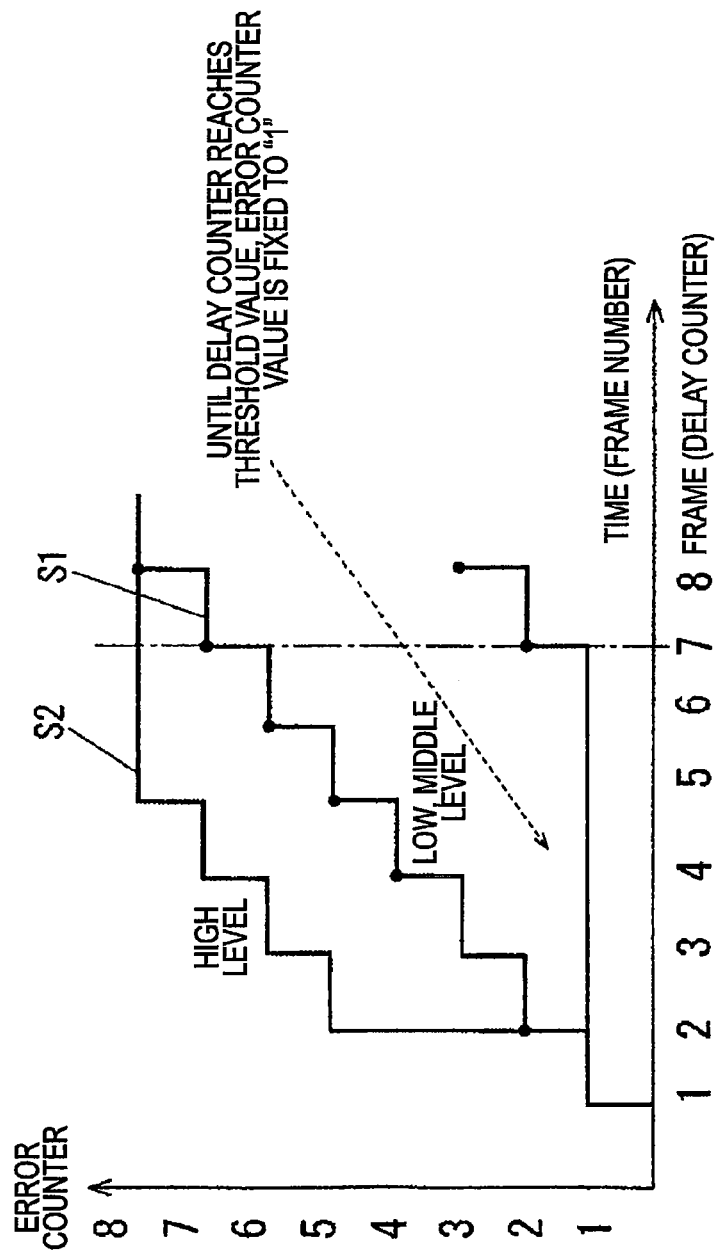
FIG. 8 is a diagram explaining an error counter.
Figure 9:
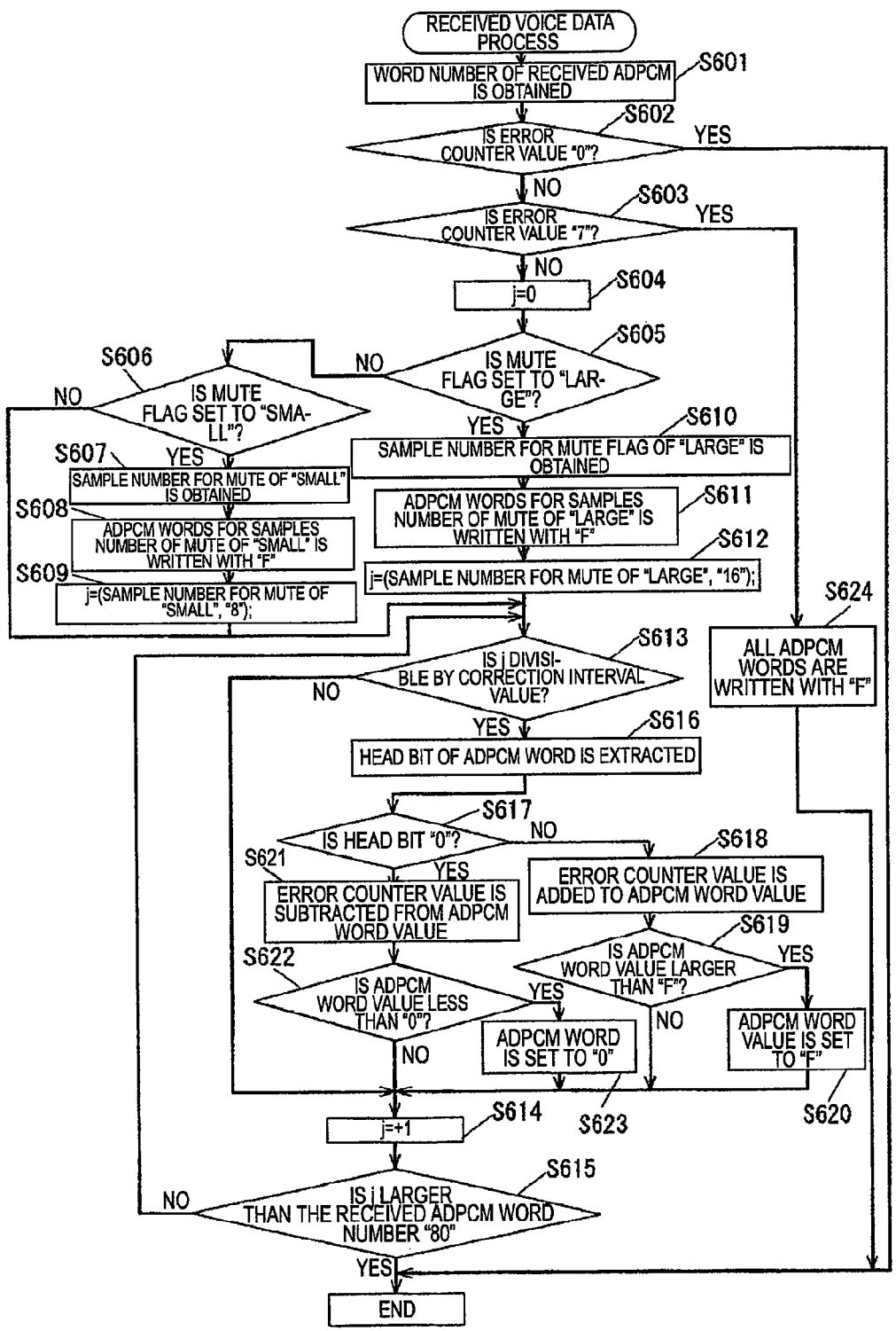
FIG. 9 is a flowchart illustrating a received voice data process.
Figure 10:
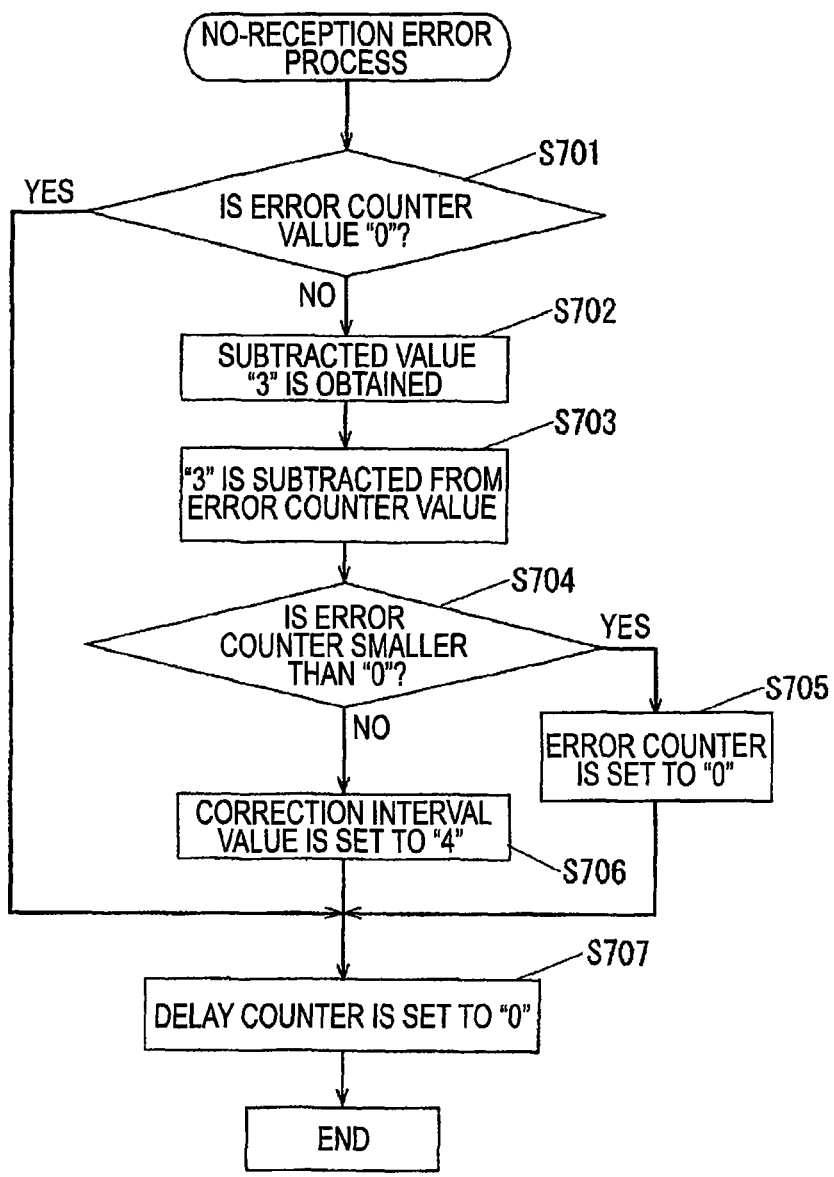
FIG. 10 is a flowchart illustrating a no reception error process.

Next, a procedure of the voice processing method of the receiver 30 of the secondary device 3 which receives the transmission frame will be described with reference to FIGS. 3 to 10. FIG. 3 is a flowchart illustrating a voice process of a receiver 30 of a secondary device 3. FIG. 4 is a flowchart illustrating a reception error process. FIG. 5 is a flowchart illustrating a sub-frame process. FIG. 6 is a diagram illustrating an error value and a correction interval value. FIG. 7 is a flowchart illustrating an error counter process. FIG. 8 is a diagram illustrating an error counter. FIG. 9 is a flowchart illustrating a received voice data process. FIG. 10 is a flowchart illustrating a no reception error process.

First, the wireless receiver 31 in FIG. 1 receives the transmission frame demodulates the transmission frame and outputs the demodulated transmission frame to the received frame separator 32. Referring to FIG. 3, as described above, the received frame separator 32 separates the syncword which is contained in the transmission frame, the control field and the CRC corresponding to the control field, and the voice data and the CRC corresponding to the voice data, outputting each one to the error detector 33, and outputting the voice data to the voice processor 35 (S100).

The error detector 33 examines whether or not the received syncword is a right bit array, whether or not the CRC error occurs in the control field, and whether or not the CRC error occurs from the first sub-frame to the fourth sub-frame, and outputs the result to the error determiner 34 as reception error information (S200).

The error determiner 34 determines whether or not a reception error occurs based on the reception error information (S300). Here, as the determining result of the error determiner 34, the case where the reception error occurs will be described.

When the reception error occurs, the error determiner 34 performs a reception error process (S400). The reception error process will be described with reference to FIG. 4.

In the reception error process shown in FIG. 4, first, it is determined whether or not the error occurs in the syncword (S401). When it is determined that there is no error in the syncword, it is determined whether or not the CRC error occurs in the control field (S402). Further, when it is determined that there is no error in the control field, it is determined whether or not the CRC error occurs in the voice data from the first sub-frame to the fourth sub-frame (S403). When it is determined that there is no error in the voice data, "0" is substituted for the error value and the reception error process is completed (S404).

When it is determined that the error occurs in the voice data (S403), a sub-frame process is performed (S420a) and the reception error process is completed. The sub-frame process will be described later.

When it is determined that the error occurs in the control field (S402), the procedure proceeds to S405 to determine whether or not the error occurs in the voice data. When it is determined that there is no error in the voice data, "0" which indicates no error is substituted for the error value (S406). In this case, the correction interval value is set to "4" (S407). When it is determined that the error occurs in the voice data (S405), the sub-frame process is performed (S420b).

In this example, when the error is not detected at all, or when a minor error occurs (when there is no error in the voice data even though the error occurs in the syncword or the control field), "0" is assigned to the error value. The correction interval value refers to a time interval when the error is examined whether or not it occurs and is corrected. When the correction interval is large, the error detection/correction is performed at a long time interval. As the correction interval becomes shorter, the error detection/correction is performed at a shorter time interval. When the error is detected but minor, the correction interval is set to a relative large value "4" instead of setting "0" to the error value, and then the error detection/correction is performed at a rough time interval.

When it is determined that the error occurs in the syncword (S401), the procedure proceeds to S408 to determine whether or not the error occurs in the control field. When it is determined that there is no error in the control field, it is determined whether or not the error occurs in the voice data (S409). When it is determined that there is no error in the voice data, "0" is substituted for the error value (S410). In addition, the correction interval value is set to "4" (S411). The reception error process is completed. The details of the correction interval value will be described later. When it is determined that the error occurs in the voice data (S409), the sub-frame process is performed (S420c) and the reception error process is completed.

As described above, even though it is determined that the error occurs in the syncword, when it is determined that there is no error in the control field and the voice data, "0" is assigned for the error value. Also in this case, the correction interval value is set to a relatively large value "4", and then the error detection/correction is performed at a rough time interval.

When it is determined that the error occurs in the control field (S408), it is determined whether or not the error occurs in the voice data (S412). When it is determined that there is no error in the voice data, "1" is substituted for the error value (S413). In addition, the correction interval value is set to "4" (S414) and the reception error process is completed. When it is determined that the error occurs in the voice data (S412), the sub-frame process is performed (S420d) and the reception error process is completed.

As described above, in the reception error process, the error value and the correction interval value thereafter are set according to contents of the error which occurs in the syncword or the error which occurs in the control field. Further, as for the error which occurs in the voice data, the error value and the correction interval value are set in the sub-frame process to be described later.

The sub-frame process will be described with reference to FIG. 5. In the sub-frame process, first, a variable "the number of the sub-frame errors" is set to "0" as an initial value (S421). In addition, a variable i is set to "1". The variable i is a counter for examining the first sub-frame to the fourth sub-frame. Sub-frame error information relating to the sub-frame is obtained among the reception error information from the error detector 33 (S422).

It is determined whether or not the error occurs in the sub-frame shown by the variable i (S423). That is, the variable i is set to "1" initially, which indicates that it is determined whether or not the CRC error occurs in the first sub-frame. When there is no error, the procedure proceeds to S424. The variable i is added with 1 (S424). It is determined whether or not the variable i is larger than a number ("4" in this embodiment) which is larger than the total number of the sub-frames (S425). When it is determined that the variable i is equal to or less than "4", the procedure proceeds to S423.

Here, when it is determined that the CRC error occurs in the sub-frames (S423), the variable "the number of the sub-frame errors" is added with "1" (S426). It is determined whether or not the variable i is equal to or less than a head mute threshold value "2" to be described later in detail (S427). When the variable i is larger than the head mute threshold value "2", the procedure proceeds to S424. When the variable i is equal to or less than the head mute threshold value "2", a head mute flag is set to be valid (S428). The head mute flag is used to instruct that a head mute process is performed on from the head of the sub-frame. When the error is detected and the variable i is equal to or less than the head mute threshold value "2", the head mute flag is valid (in the first sub-frame and the second sub-frame), and the mute process is performed on from the head of the sub-frame.

When all the sub-frames are examined, it is determined whether or not the variable "the number of the sub-frame errors" is equal to or more than the sub-frame error threshold value (S429). In the embodiment, the sub-frame error threshold value is set to "3". That is, when the number of the sub-frames where the CRC errors occur in one transmission frame is 3 or more, the variable "the number of the sub-frame errors" is set to be equal to or more than the sub-frame error threshold value (S429).

When it is determined that the number of the sub-frames where the errors occur is less than the sub-frame error threshold value "3", and that the error occurs in the syncword and the control field in the sub-frame process, a sub-frame error value is set to "2", and in other cases the sub-frame error value is set to "1" (S430). In addition, the correction interval value is set to "4" (S431).

When it is determined that the number of the sub-frames where the errors occur is equal to or more than the sub-frame error threshold value "3" (S429), the error value is set to "3" (S432). When it is determined that both synchronizing errors and control errors occur in the syncword and the control field in the sub-frame process, the correction interval value is set to "1", and in other cases the correction interval value is set to "2" (S433).

As described above, in the sub-frame process, the error corresponding to each sub-frame constituting the transmission frame is examined, the number of times that the error occurs is counted, and the error value and the correction interval value are set according to the counted number of the sub-frame errors. In addition, when the sub-frame where the error occurs is located before a predetermined sub-frame, that is, when it is the first or the second sub-frame, the head mute flag is set to be valid.

Here, the error value and the correction interval value will be described with reference to FIG. 6.

No. 1 shows that there is no error in the transmission frame. Therefore, the error value is set to "0" which means the lowest level, and the voice data is decoded without correction. Since there is no correction, the correction interval value is not set.

No. 2 and No. 3 show that the error occurs in any one of the syncword and the control field, and there is no error in the voice data. In this case, the error value is set to "0", and the correction interval value is set to "4". When a transmission packet is sent from a sending side in the time-division multiplex method, even though the transmission packet is not perfectly synchronized at a receiving side by the syncword, the transmission packet is normally synchronized with a clock upon being received at the receiving side, and thus the voice data can be received. That is, even though the error occurs in any one of the syncword and the control field, when there is no error in the voice data, it is possible to reproduce the voice. In this case, the correction interval value is set to "4", so that the correction process is performed at low frequency by making the time interval relatively longer.

No. 4 shows that the errors occur in both the syncword and the control field, but there is no error in the voice data. In this case, it is likely that the transmission frame cannot be normally received as a whole. Therefore, since there is some fear that the error cannot be detected by the CRC even though there is no error in the voice data, the error value is set to "1". Further, also in this case, the correction frequency is set to be low by setting the correction interval value to "4".

Nos. 5 to 7 show that the errors do not occur simultaneously in both the syncword and the control field, and the total number of the sub-frames where the error occurs is less than the threshold value "3". In this case, since the error occurs in the voice data, there is a need for correcting the voice data. Further, since the number of the sub-frames where the errors occur is small, it is sufficient to correct the voice data in the low level. The error value is set to "1", and the correction interval value is set to "4".

No. 8 shows that the errors occur in both the syncword and the control field, and the total number of the sub-frames where the errors occur is less than the sub-frame error threshold value "3". In this case, since the errors occur in both the syncword and the control field even though the occurrence frequency of the error in the sub-frame is low, there is some fear that the error occurs also in the normal sub-frame as described above. Therefore, the error value is set to "2" which indicates the error in a middle level, and the correction interval value is set to "4".

Nos. 9 to 11 show that there is no error in both the syncword and the control field, and the total number of the sub-frames where the errors occur is equal to or more than the sub-frame error threshold value "3". In this case, since the occurrence frequency of the error in the sub-frame is high, the error value is set to "3" which indicates the error in a high level, and the correction interval value is set to "2". By making the correction interval value shorter, a correction level of the ADPCM word becomes higher.

No. 12 shows that the errors occur in both the syncword and the control field, and the total number of the sub-frames where the errors occur is equal to or larger than the sub-frame error threshold value. In this case, since the occurrence frequency of the error in the sub-frame is high, the error value is set to "3" which indicates the error in the high level, and the correction interval value is further increased to "1".

According to the above-mentioned embodiment, among the error which occurs in each of the syncword, the control field, and the voice data, a voice data error has more weight than errors in the syncword and the control field in terms of determining the error value and the correction interval value. As a result, it is suppressed that an excessive deterioration in voice quality is caused.

Returning to FIG. 3, when the reception error process (S400) is completed, the error determiner 34 performs an error counter process (S500). The error counter process will be described with reference to FIG. 7.

In the error counter process shown in FIG. 7, first, it is determined whether or not the error value which is set in the reception error process and the sub-frame process performed in the reception error process is "0". (S501). When it is determined that the error value is "0", it indicates that there is no error in the syncword, the control field, and the voice data, so that the procedure is completed as it is.

When it is determined that the error value is not "0" (S501), it is determined whether or not the error value is equal to or less than a low level threshold value (S502). That is, whether or not the importance degree of the detected error is in the low level is determined by comparing the error value with the low level threshold value. In the embodiment, when the error is in the low level, it is determined by setting the low level threshold value to "1".

When it is determined that the error value is equal to or less than the low level threshold value, a delay counter which is stored in the error determiner 34 is obtained (S503). The delay counter is provided in order to obtain information, when the error is detected, on whether or not the errors continuously occur subsequently to the previous frame. The voice process by the delay counter will be described later.

It is determined whether or not the delay counter is equal to or less than a threshold value (S504). When it is determined that the delay counter is equal to or less than the threshold value, the error counter is set to "1", and the correction interval value is set to "4" (S505). The error counter is a counter which adds values according to the error values, and becomes the correction value for correcting the voice data. In S505, "1" is fixedly substituted for the error counter. This means that, in the interval where the delay counter is equal to or less than the threshold value, the voice data is corrected by using the smallest correction value, and when the delay counter becomes larger than the threshold value, the correction delay is completed and thus the added value by the error counter becomes the correction value of the voice data.

Here, the threshold value is set to "6" and the determination is performed. Therefore, when the delay counter is equal to or less than "6", the error counter is set to be "1". As a result, it is possible to apply the low level correction to the transmission frame which is subsequently to the transmission frame where the error occurs until the delay counter is equal to or less than the threshold value. In this case, if the low level errors occur continuously, there is some fear that, when the correction is performed based on the error counter, the correction is excessively performed. Therefore, when the importance degree of the error is in the low level, the voice data is corrected by using the correction value according to the low level, and the correction by the added value is delayed after a predetermined number of the transmission frames are received, so that, while suppressing the generation of scratch noise, it is possible to reduce an effect on the voice quality.

It is determined whether or not the delay counter is "0", or the head mute flag is set (S506). The determination whether or not the delay counter is "0" is to determine whether or not the correction delay is performed by using an added value of the error counter as the correction value subsequently to the previous received transmission frame. In addition, the determination whether or not the head mute flag is set is to determine where the error which occurs in the voice data corresponds to the first sub-frame or the second sub-frame.

Therefore, when the delay counter is "0", it indicates that the correction delay is not performed subsequently to the previously received transmission frame. Therefore, in order to instruct the correction which is performed when the low level error occurs, the mute flag is set to be "small" (S507). In addition, when the head mute flag is set, it indicates that the error occurs in the first sub-frame or the second sub-frame where the scratch noise is easy to occur. Therefore, in order to instruct the mute process to be performed, the mute flag is set to be "small" (S507). The delay counter is added with 1 (S508), and the procedure is completed.

Further, when the delay counter is not "0" (S506), since the error occurs in the transmission frame which is previously received, it indicates that the correction using the added value of the error counter as the correction value is delayed. Therefore, the correction of the voice data is not newly set, and in order to keep the previous state, the procedure proceeds to S508 without performing S507 (mute flag is kept as it is) and is completed. In addition, when the head mute flag is not set, the sub-frame where the error occurs indicates that it is located after the sub-frame where the scratch noise is easy to occur, so that the procedure proceeds to S508 without performing S507 and is completed.

When the delay counter is larger than the threshold value ("6") (S504), the error counter is added with "1" (S509). It is determined whether or not the error counter is larger than "7" (S510).

In the embodiment, the ADPCM word is 4-bit data and has the error counter maximum value of 7. Therefore, when the error counter is larger than 7, "7" is substituted for the error counter (S511), and the procedure is completed. When it is determined that the error counter is equal to or less than 7 (S510), the procedure is completed as it is. In S510, the value which is used for determining is set to the maximum value of the error counter.

When it is determined that the error value is more than the low level threshold value (S502), it is determined whether or not the error value is equal to or larger than the high level threshold value (S512). That is, whether or not the importance degree of the detected error is in the high level is determined by the error value. In the embodiment, the error being in the high level is determined by setting the high level threshold value to "3".

When the error value is less than the high level threshold value, it is determined whether or not the error counter is 0 (S513). This means that it is determined whether or not the error occurs in the transmission frame which is previously received. When the error counter is "0", the mute flag is set to "small" (S514). In addition, the error counter is added with "1" (S515). That is, since there is no error in the transmission frame which is previously received even though the level of the error is the middle level, the mute flag is set to "small". The procedure proceeds to S510.

When it is determined that the error value is in the middle level threshold value (S512), the mute flag is set to "large" (S516). Further, the error counter is added with "3" which is larger than that in the case of the low level or the middle level (S517). The procedure proceeds to S510.

As described above, in the error counter process, the error value is used as a value for evaluating the importance degree of the error which occurs in the received transmission frame, and the addition, etc. of the error counters which correspond to the errors in the low level, the middle level, and the high level are performed.

Here, the error counter will be described with reference to FIG. 8. The error counter is added with values corresponding to the error values, and thereby calculating the occurrence frequency of the error. For example, when the error is in the low level or the middle level, the error counter is added with "1" (S509 or S515 of the error counter process, refer to FIG. 7). That is, when the error occurs such that the error value corresponds to "1" or "2" in one period of the transmission frame, the error counter is increased by "1" (illustrated as a broken line S1 shown in FIG. 8). However, when the error in the high level occurs such that the error value corresponds to "3" in the received transmission frame, the error counter is increased by "3" at once (illustrated as a broken line S2 shown in FIG. 8).

However, when the error is in the low level, the addition of the error counter by the error value is performed by the time when the delay counter is larger than "6". During the delay counter is equal to or less than "6", the error counter is set to "1" (S505), and when the delay counter is equal to or more than "7", the addition by the error value is performed.

Returning to FIG. 3, when the error counter process is completed (S500), the voice processor 35 (refer to FIG. 1) performs a received voice data process (S600). The received voice data process will be described with reference to FIG. 9.

In the received voice data process shown in FIG. 9, the number of the ADPCM words which is the voice data received from the received frame separator 32 is obtained (S601). For example, when the voice data from the first sub-frame to the fourth sub-frame have 320 bits, the number of the ADPCM words is 80 words.

It is determined whether or not the error counter transported from the error determiner 34 is "0" (S602). When the error counter is "0", it indicates that there is no error. Therefore, the voice data (ADPCM words) from the first sub-frame to the fourth sub-frame are not corrected but just outputted to the ADPCM decoder 36 as they are, and the received voice data process is completed.

When the error counter is not "0" (S602), it is determined whether or not the error counter is the maximum value "7" (S603). When the error counter is not "7", the initial value "0" is substituted for a variable j (S604).

It is determined whether or not the mute flag is set to "large" (S605). The mute flag is set in S507, S514, and S517 of the error counter processes (refer to FIG. 7).

When the mute flag is not set to "large", it is determined whether or not the mute flag is set to "small" (S606). When the mute flag is set to "small", the number of samples with respect to the mute flag of "small" which is set in the voice processor 35 is obtained (S607). In this embodiment, the number of the samples with respect to the mute flag of "small" is set to "8".

The ADPCM words corresponding to the number of the samples (8 words) from the head of the voice data are replaced by writing "15" ("F" in hexadecimal number) indicating the mute (S608). That is, the mute process is performed where 32 bits from the head bit of the first sub-frame are set to "1" as a whole. As a result, the received transmission frame comes to be reduced in sound volume during the period of time corresponding to 8 words. Since the scratch noise is easy to occur in the vicinity of the head of the first sub-frame, when the importance degree of the error is the low level or the middle level in the error counter process (refer to FIG. 7), the voice volume is in the mute state only for a short period of time. Therefore, while suppressing the generation of the scratch noise, it is possible to reduce an effect on the voice quality.

Further, in the embodiment, when the importance degree of the error is the low level or the middle level, the mute flag is set to "small". However, the correction level by the mute process may be different in the low level and the middle level from each other. In addition, when the importance degree of the error has more steps than 3 steps, the number of the samples on which the mute process is performed may be increased according to the number of the steps.

The number of the samples for the mute flag of "small" is substituted for the variable j (S609). In the embodiment, since the number of the samples for the mute flag of "small" is "8", "8" is substituted for the variable j. When the mute flag is set to "small" (S606), the procedure proceeds to the next procedure without setting the mute.

When the mute flag is set to "large" (S605), the number of the samples for the mute flag of "large" which is set in the voice processor 35 (S610) is obtained. In the embodiment, the number of the samples for the mute flag of "large" is set to "16".

The ADPCM words corresponding to the number of samples from the head of the voice data is replaced by writing "15" ("F" in hexadecimal number) indicating the mute (S611). That is, the mute process is performed where 64 bits from the head bit of the first sub-frame are set to "1". As a result, the voice of the received transmission frame comes to be reduced in sound volume during the period of time corresponding to 16 words which is twice compared with that in the case where the mute flag is "small". Since the scratch noise is easy to occur in the vicinity of the head bit of the first sub-frame as well as the importance degree of the error is the high level, the level where the scratch noise occurs becomes higher compared with the low level or the middle level. Therefore, by reducing the sound volume during a long period of time, it is possible to further suppress the scratch noise with efficiency.

The number of the samples for the mute flag of "large" is substituted for the variable j (S612). In the embodiment, since the number of the samples for the mute flag of "large" is set to "16", "16" is substituted for the variable j.

As described above, when the mute flag is set to "small" or "large", the sound volume comes to be reduced for a predetermined period of time corresponding to the set value, so that the correction according to the importance degree of the error can be performed. Therefore, it is possible to prevent the scratch noise from occurring in accordance with the importance degree of the error, and a decrease in voice quality at the time when the error occurs in reception can be suppressed at the minimum.

It is determined whether or not the variable j is divisible by the correction interval value which is informed from the error determiner 34 (S613). When the procedure proceeds from S609 to S613, the variable j is "8", and when the procedure proceeds, from S612 to S613, the variable j is "16". For example, when it is determined that only the synchronizing error occurs in the received transmission frame, since the correction interval value is set to "4" in S412 of the received error process (refer to FIG. 4), the variable j is divisible. Therefore, the procedure proceeds to S616 or later.

Here, when the variable j is not divisible by the correction interval value, the procedure proceeds to S614 and the variable j is added with "1". It is determined whether or not the value indicated by the variable j is larger than the number of the ADPCM words (80 words in this embodiment) (S615). When the variable j is larger, it indicates that all the ADPCM words are processed, so that the received voice data process is completed.

When the variable j is equal to or less than the number of the ADPCM words, the procedure proceeds to S613, and once again it is determined whether or not the variable j is divisible by the correction interval value.

When it is determined that the variable j is divisible (S613), the head bit (MSB) in the ADPCM word is extracted (S616). In this case, an ADPCM word which is located at the variable j-th from the voice data is targeted. That is, in the case where the correction interval value is "4", when the procedure proceeds from S606 where the mute process is not performed, first, the 0-th ADPCM word (first word of the head of the first sub-frame) is targeted, and next the 4-th ADPCM word is targeted.

When the procedure proceeds from S609 where the mute process for the mute flag of "small" is performed, first, the 8-th (9-th word of the first sub-frame) ADPCM word is targeted, and next the 12-th ADPCM word is targeted.

For example, when the correction interval value is "2", and the procedure has been carried out from S612 where the mute process for the mute flag of "large" is performed, first, the 16-th ADPCM word is targeted, and next the 18-th ADPCM word is targeted.

It is determined whether or not the head bit of the extracted ADPCM word is "0" (S617). Since the ADPCM word is expressed as a signed binary number, when the head bit is "0", it indicates that an integer, that is, a differential value is added. When the head bit of the ADPCM word is "1", it indicates that a negative number, that is, a differential value is subtracted.

According to the sign expressed by "0" or "1" of the head bit, a value of the importance degree of the error is subtracted or added from/to an ADPCM word value (S618 and S621). When the sign of the ADPCM word is "0" (addition of the differential value), the error counter value is subtracted from the ADPCM word value (S621), and the procedure proceeds in a direction where a change in the value after being decoded is suppressed. In this regard, when the sign of the ADPCM word is "1" (subtraction of the differential value), the error counter value is added to the ADPCM word value (S618) and, also in this case, the procedure proceeds in a direction where a change in the value after being decoded is suppressed. As described above, the error counter value according to the importance degree of the error is subtracted or added from/to the ADPCM word value according to the sign of the ADPCM word.

After S618, it is determined whether or not the ADPCM word is larger than "15" ("F" in hexadecimal number) (S619). When the ADPCM word is larger than "15", the ADPCM word is set to "15" ("F" in hexadecimal number) (S620). In addition, after S612, it is determined whether or not the ADPCM word is less than "0" (S622). When the ADPCM word is less than "0", the ADPCM word is set to "0" (S623). Further, the variable j is added with 1 (S614), and it is determined whether or not processes for all the ADPCM words are completed (S615) and, if so, the received voice data process is completed.

When the error counter value is "7" (S603), it means that the occurrence frequency of the error comes to be in an error state at the high level by adding much. In this case, all the ADPCM words are written by "15" ("F" in hexadecimal number) indicating the mute (S624), and thereby reducing the sound volume of the voice.

As described above, in the received error process (refer to FIG. 4) and the sub-frame process (refer to FIG. 5), the error counter value which is added every time the error occurs is used as the correction value on the basis of the error value which is set according to the importance degree of the error, the differential value inputted to the ADPCM decoder 36 is converted into a smaller value according to the correction value, and thus a variation width of the PCM data after being decoded can be suppressed to be narrow. Therefore, since the correction of the voice data can be performed according to the importance degree of the error, it is also applicable to plural transmission frames where the errors occur frequently. Accordingly, it is also applicable to the reception error by radio wave interference or the like, the scratch noise can be prevented, and a decrease of the voice quality at the time when the error occurs in reception can be suppressed at the minimum.

Further, in the received error process (refer to FIG. 4) and the sub-frame process (refer to FIG. 5), using the correction interval values which are set according to the importance degree of the error, the interval of time positions when the correction is performed on an array of the received voice data (ADPCM word) is changed, and thereby correcting the voice data at the frequency of the error according to a degree of the error and it is possible to prevent the correction from being performed excessively (rapid change in the output PCM data). Therefore, a decrease of the voice quality can be suppressed.

Returning to FIG. 3, based on the determination result of the error determiner 34, when there is no reception error (S300), the error determiner 34 performs a no-reception error process (S700).

As shown in FIG. 10, in the no-reception error process, first, it is determined whether or not the error counter is "0" (S701). When the error counter is not "0", the subtraction value which is set in the error determiner 34 is obtained (S702). In the embodiment, the subtraction value is set to "3". The subtraction value "3" is subtracted from the error counter (S703). That is, when there is no error, the error counter which is a level to correct the voice data is subtracted, and thereby relaxing the level of the correction. For example, when there is no error in the transmission frame, the error counter may be set to "0" in order to rapidly recover the sound volume. However, if the sound volume is rapidly recovered, there is some fear that the scratch noise occurs in the voice data. In the embodiment, in order to suppress the generation of scratch noise while recovering the sound volume rapidly, the error counter is subtracted so as to be a predetermined value.

It is determined whether or not the subtracted error counter is less than "0" (S704). When the error counter is less than "0", the error counter is set to "0" (S705).

When the error counter is equal to or more than "0", the correction interval value is set to "4" (S706).

For example, when the synchronizing error and the control error does not occur, and the sub-frame error in which the voice data exceeds the sub-frame error threshold value "3", occurs, the correction interval value is set to "2" (refer to No. 9 shown in FIG. 6). Therefore, in this case, the ADPCM word is corrected every second word. However, when the transmission frame in which there is no error (all the sub-frames have no error) is received once, the correction interval is widened from 2 words to 4 words as shown in FIG. 10 (S706), so that the correction frequency is lowered. Next, the delay counter is set to "0" (S707). By setting the delay counter to "0", even if the error is detected at the following transmission frames, it can be known that the error does not continuously occur subsequently to the previous transmission frame.

As described above, when there is no error, the error counter value is decreased or the correction interval value is increased. When conditions are improved from the occurrence state of the error and no-error frames are continuously transmitted from some time, the error counter value which has been increased when the error occurs is decreased or the correction interval value is increased, so that the correction is relaxed. That is, in S504 shown in FIG. 7, when the delay counter is "0" (equal to or less than the threshold value), the error counter which determines the level of the correction is set to a relatively lower value "1", and the correction interval value is set to a relatively higher value "4". In the range of the delay counter which is equal to or less than the threshold value, these values are maintained without increasing the error counter. Even when conditions are worsened from the state of no error and the error occurs continuously, the error counter is delayed to count up until the delay counter reaches the threshold value. When the no-error transmission frames are transmitted continuously, the error counter begins to be subtracted and the error counter becomes "0" (S705), so that the voice quality can be rapidly recovered.

In this way, when there is no error in reception, the error counter value is decreased by the process shown in FIG. 10. Therefore, it is possible to reduce the level of the correction.

Hereinbefore, the embodiment of the invention has been described. However, the invention is not limited thereto. For example, in the embodiment, even though the voice data is divided into four sub-frames from the first sub-frame to the fourth sub-frame in the transmission frame, the number of the division can be determined properly. That is, if the voice data is divided into n (n is a natural number) sub frames, the first sub-frame to the n-th sub-frame exists in the transmission frame. In this case, the sub-frame error threshold value is also changed according to the number of the divided sub-frames. In addition, the threshold values or the setting values according to the embodiment are only an example, and thus as long as magnitude relation between the values relating thereto is maintained, other values can be selected.

Many modifications and variations of the present invention are possible in the light of the above techniques. It is therefore to be understood that within the scope of the invention may be practiced than as specifically described.

The present application is based upon and claims the benefit of priority of Japanese Patent Application No. 2008-24679 filed on Feb. 5, 2008, the contents of which are incorporated in its entirety.

What is claimed is:

1. A voice processing apparatus in an ADPCM (Adaptive Differential Pulse Code Modulation) voice transmission system in which voice data that is differentially quantized through an ADPCM scheme is transmitted, the voice processing apparatus comprising:
   an error detector which detects whether or not an error occurs in a transmission frame containing voice data that indicates a differential value;
   an error determiner which determines a level of the error detected by the error detector when the error detector detects the error;
   a voice processor which corrects the voice data with a correction value depending on the level of the error detected by the error detector; and
   an ADPCM decoder which decodes the voice data corrected by the voice processor,
   wherein the voice processor defines a correction interval value for determining a time interval for correction, and changes the correction interval value according to the level of the error, and
   the voice processor corrects the voice data with a longer time interval by setting the correction interval value to a larger value as the level of the error is lower, and corrects the voice data with a shorter time interval by setting the correction interval value to a smaller value as the level of the error is higher.

2. The voice processing apparatus according to claim 1, wherein the voice processor corrects the voice data from a head bit for a given time length depending on the level of the error by replacing with a value that indicates a mute so that a volume of the voice data is attenuated.

3. The voice processing apparatus according to claim 1, wherein the voice processor subtracts or adds a value depending on the level of the error from/to the voice data according to a sign pertaining to the voice data that indicates an ADPCM differential value to suppress a change in a value of the voice data decoded by the ADPCM decoder.

4. The voice processing apparatus according to claim 1, wherein the error detector detects respective errors in a syncword, a control field, and the voice data that constitute the transmission frame, and
   the error determiner gives more weight to the error in the voice data than errors in the syncword and the control field.

5. The voice processing apparatus according to claim 1, wherein the error determiner accumulates values according to the level of the error and calculates an occurrence frequency of the error, and
   the voice processor corrects the voice data with a correction value based on the occurrence frequency of the error.

6. The voice processing apparatus according to claim 5, wherein when the level of the error is a low level, the voice processor corrects the voice data with a correction value corresponding to the low level, and delays a correction of the error with the correction value based on the occurrence frequency of the error after a predetermined number of transmission frames including errors are received.

7. The voice processing apparatus according to claim 1, wherein the error detector examines whether or not the error occurs in each of a plurality of subframes which constitute the transmission frame, and
when a subframe in which the error occurs is within first to n-th subframes of one transmission frame, where n indicates a natural number selected from one to a number of subframes in the one transmission frame, the voice processor performs muting in an entire of the one transmission frame.

8. The voice processing apparatus according to claim 1, wherein the error detector examines whether or not the error occurs in each of a plurality of subframes which constitute the transmission frame, and
the voice processor counts a number of subframes in which an error occurs among one transmission frame, and corrects the correction value or a correction interval value depending on the counted number of subframes in which the error occurs.

9. A voice processing apparatus in an ADPCM (Adaptive Differential Pulse Code Modulation) voice transmission system in which voice data that is differentially quantized through an ADPCM scheme is transmitted, the voice processing apparatus comprising:
an error detector which detects whether or not an error occurs in a transmission frame containing voice data that indicates a differential value;
an error determiner which determines a level of the error detected by the error detector when the error detector detects the error;
a voice processor which corrects the voice data with a correction value depending on the level of the error detected by the error detector; and
an ADPCM decoder which decodes the voice data corrected by the voice processor,
wherein the voice processor corrects the voice data in one transmission frame from a head bit for a given time length depending on the level of the error by replacing with a value that indicates a mute so that a volume of the voice data is attenuated,
wherein the error determiner determines the level of the error depending on whether or not the error occurs in a vicinity of a head of the one transmission frame.

10. The voice processing apparatus according to claim 9, wherein the voice processor changes a correction interval value for determining a time interval for correction according to the level of the error,
the voice processor corrects the voice data with a longer time interval by setting the correction interval value to a larger value as the level of the error is lower, and the voice processor corrects the voice data with a shorter time interval by setting the correction interval value to a smaller value as the level of the error is higher.

11. The voice processing apparatus according to claim 9, wherein the error detector examines whether or not the error occurs in each of a plurality of subframes which constitute the one transmission frame, and
the error determiner determines the level of the error according to whether a subframe in which the error occurs is within or outside first to n-th subframes of the one transmission frame, where n indicates a natural number selected from one to a number of subframes in the one transmission frame.

12. The voice processing apparatus according to claim 9, wherein the error detector examines whether or not the error occurs in each of a plurality of subframes which constitute the transmission frame, and
when a subframe in which the error occurs is within first to n-th subframes of the one transmission frame, where n indicates a natural number selected from one to a number of subframes in the one transmission frame, the voice processor validates a head mute flag to perform muting on a limited sample number of ADPCM words from its head.

13. The voice processing apparatus according to claim 9, wherein the error detector examines whether or not the error occurs in each of a plurality of subframes which constitute the transmission frame, and
the voice processor counts a number of subframes in which an error occurs among the one transmission frame, and corrects the correction value or a correction interval value depending on the counted number of subframes in which the error occurs.

14. A voice processing method in an ADPCM (Adaptive Differential Pulse Code Modulation) voice transmission system in which voice data that is differentially quantized through an ADPCM scheme is transmitted, the method comprising:
detecting whether or not an error occurs in a transmission frame containing the voice data;
determining a level of the detected error when the error is detected;
correcting the voice data with a correction value depending on the level of the detected error; and
decoding the corrected voice data,
wherein a voice processor defines a correction interval value for determining a interval for correction, and changes the correction interval value according to the level of the error, and
the voice processor corrects the voice data with a longer time interval by setting the correction interval value to a larger value as the level of the error is lower, and corrects the voice data with a shorter time interval by setting the correction interval value to a smaller value as the level of the error is higher.

* * * * *